W. REID.
SELF SOLDERING CABLE JOINT.
APPLICATION FILED APR. 6, 1908.

927,166. Patented July 6, 1909.

Witnesses
Adolph R. Swoboda.
Frank B Klasen

William Reid
Inventor

UNITED STATES PATENT OFFICE.

WILLIAM REID, OF CHICAGO, ILLINOIS.

SELF-SOLDERING CABLE-JOINT.

No. 927,166.   Specification of Letters Patent.   Patented July 6, 1909.

Application filed April 6, 1908. Serial No. 425,490.

*To all whom it may concern:*

Be it known that I, WILLIAM REID, a citizen of the United States, residing in Chicago, county of Cook, and State of Illinois, have invented certain new and useful Improvements in Self-Soldering Cable-Joints, of which the following is a specification.

My invention relates to self-soldering cable joints.
The object of my invention is to provide a self-contained cable joint which may be applied to a lead covered cable by a person not skilled in the art of cable splicing and not skilled in the art of making wipe joints.
In carrying out my invention I preferably provide a thin copper or asbestos shell lined internally with solder or other adhesive material adapted to be heated to cause the same to adhere to the two parts of the cable to be joined. My invention may likewise be applied to lead piping, or piping of any form which it is customary to join by the use of solder.

Figure 1:
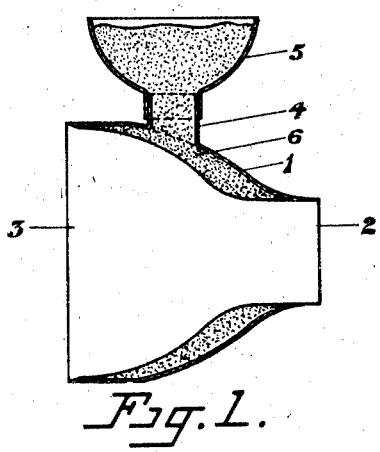
Figure 2:
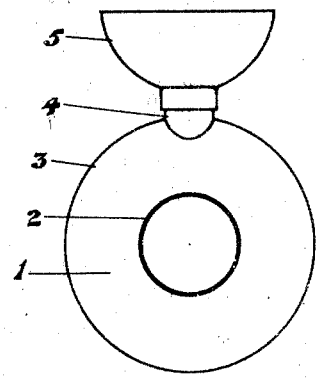
Figure 3:
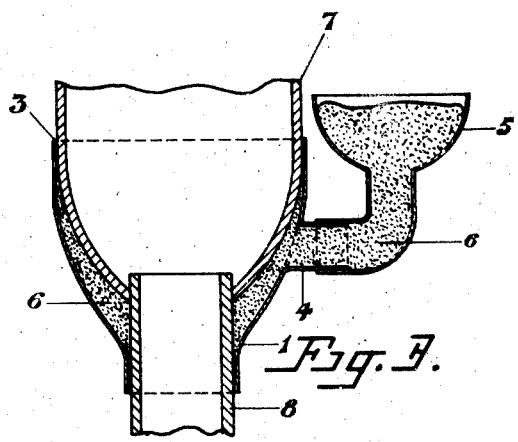
Figure 4:
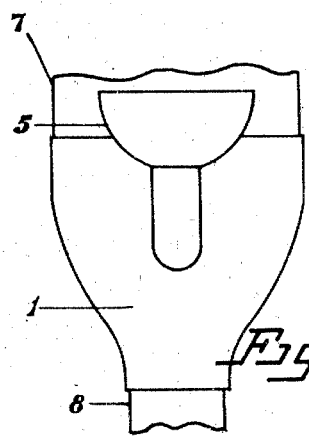
Figure 5:
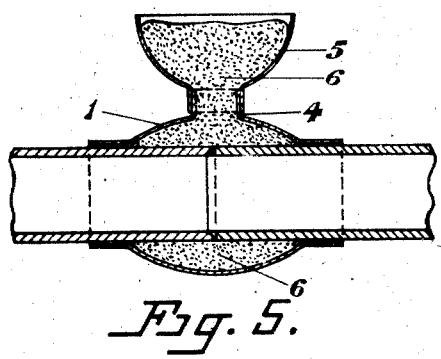
Figure 6:
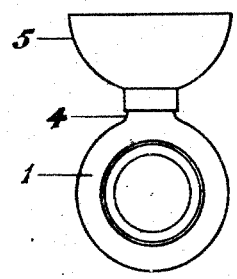

My invention is illustrated in the accompanying drawing, in which,

Figure 1 is a sectional view of the device of my invention adapted for joining two pieces of horizontal tubing of different sizes. Fig. 2 is an end view of the joint of Fig. 1.
Fig. 3 is a sectional view of a joint as applied to two pieces of vertical tubing. Fig. 4 is a side view of the joint shown in Fig. 3. Fig. 5 is a sectional view of a joint as applied to two pieces of lead piping of the same size, and Fig. 6 is an end view of the joint shown in Fig. 5.

In the preferred form of my invention the casing 1 is made of thin pressed copper and is formed with the openings 2 and 3, into which the parts to be joined are inserted, these parts being preferably first fitted to one another so that the solder will not flow into the interior of the tube. The joint is preferably supplied with a spout 4, upon the outside of which the funnel, or reservoir 5 is tightly fitted. The intermediate part of the shell is lined with solder or other material 6 and the tube of the spout and the reservoir are filled with the same material which is allowed to cool, the whole forming a unitary structure which may be readily carried about and applied to the parts which it is desired to join.

In Fig. 3 the sheath 7 and the cable 8 are shown inserted in the joint, and the joint is shown in the condition it assumes after it has been heated.

In using the joint, the openings through which the tubes are inserted are preferably closely wound with cloth, paper or asbestos, and then the central part of the joint and the reservoir are heated with a blow torch until the solder is melted and conforms with and adheres to the two portions of the cable to be joined. When the solder is almost cooled the funnel 5 is removed, leaving the joint in substantially the same form as the usual wipe joint, except for the spout 4. If it becomes necessary to use the joint a second time, it is simply heated and slipped off in the same manner as it was put on. In reapplying the joint to the pipe, a new reservoir is placed over the spout and solder is poured in and then the whole is heated with a blow torch in the same manner as when the joint was originally made.

When an asbestos shell is used, the shell is preferably torn or scraped off after the solder has become solid, though for inside work, where the joint is not subject to moisture, the asbestos shell may be left on and re-used in the same manner as the copper shell.

Though I have shown and described my invention with respect to a definite form, it is to be understood that it may be made in a number of different forms, for example, the joint may be provided with a greater number of openings than two, one or more of said openings being at each end. Likewise, the shell need not be made of as thin material as is shown, but for certain classes of work, may be made of cast metal and may be much heavier than in the preferred form here shown and described. Still further changes may be made without departing from the spirit or scope of my invention.

I claim:

1. In a self soldering joint, the combination with a casing having openings fitting closely about the parts to be joined, of a sealing solid lining said casing, a reservoir attached to the casing and containing similar sealing solid, the said casing and reservoir being adapted to be heated to melt the sealing solid and cause it to adhere to the parts to be joined, substantially as described.

2. In a self soldering joint, the combination with a casing having openings fitting closely about the parts to be joined, an enlargement between the openings having solder therein, a detachable reservoir connected with the solder-containing part of the casing, said reservoir containing solder adapted to supply the casing to fill all parts thereof when the casing and reservoir are heated, substantially as described.

3. In a self-soldering cable joint, the combination with a thin casing having openings adapted to fit closely about the portions of the cable to be joined, the wall of said casing having an opening therein, a projecting flange about said opening, a funnel adapted to fit closely over the outside of said flange and a sealing solid lining the inside of said casing and filling the flange and funnel, substantially as described.

4. In a self-soldering pipe joint, the combination with a thin casing having openings therein fitting closely about the parts to be joined, said casing having an opening in the wall thereof, a flange extending outwardly from the wall and surrounding said opening, a funnel removably attached to said flange, solder lining said casing and filling said flange, the portion within the casing being formed to substantially conform with the parts to be joined, the whole being adapted to be heated to cause the solder to adhere to the parts to be joined and the funnel being adapted to be removed while the solder is in a plastic condition, substantially as described.

5. In a self-soldering cable joint, the combination with a casing having openings fitting closely about the parts to be joined, of a sealing solid within the casing a source of sealing solid supply for said casing, the space between said casing and the cable being thereby maintained completely filled with solder after the casing and source have been heated and the solder is melted, substantially as described.

Signed by me this 4th day of April, 1908, in the presence of two witnesses.

WILLIAM REID.

Witnesses:
M. B. McGONIGLE,
EVELYN C. NAYLOR.